United States Patent
Lai

(10) Patent No.: US 8,675,160 B2
(45) Date of Patent: Mar. 18, 2014

(54) DISPLAY DEVICE

(75) Inventor: Chi-Kuang Lai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 114 days.

(21) Appl. No.: 13/092,972

(22) Filed: Apr. 24, 2011

(65) Prior Publication Data

US 2012/0147298 A1  Jun. 14, 2012

(30) Foreign Application Priority Data

Dec. 10, 2010 (TW) ............................. 99143263 A

(51) Int. Cl.
*G02F 1/1337* (2006.01)

(52) U.S. Cl.
USPC .......................................... 349/129; 349/117

(58) Field of Classification Search
USPC .................................. 349/129, 96
See application file for complete search history.

(56) References Cited

U.S. PATENT DOCUMENTS

| | | | |
|---|---|---|---|
| 6,392,727 B1 | 5/2002 | Larson | |
| 6,933,991 B2 | 8/2005 | Sanelle | |
| 2005/0184969 A1 | 8/2005 | Dunn | |
| 2006/0055845 A1 | 3/2006 | Hisatake | |
| 2006/0262255 A1 * | 11/2006 | Wang et al. | 349/114 |
| 2009/0231517 A1 | 9/2009 | Shiraogawa | |
| 2010/0020045 A1 | 1/2010 | Walsh | |

FOREIGN PATENT DOCUMENTS

| | | |
|---|---|---|
| CN | 1826552 A | 8/2006 |
| TW | 459154 | 10/2001 |
| TW | 200745693 | 12/2007 |
| TW | M358316 | 6/2009 |
| TW | 200928521 | 7/2009 |
| TW | M381122 | 5/2010 |

* cited by examiner

*Primary Examiner* — Phu Vu
(74) *Attorney, Agent, or Firm* — Winston Hsu; Scott Margo

(57) ABSTRACT

A display device is provided. The display device includes a liquid crystal display panel, a cover lens, a first optical film and a first polarized film. The liquid crystal display panel is vertical alignment mode. The cover lens is disposed on a light exit surface of the liquid crystal display panel. The first optical film having a ¼ wavelength retardation effect is disposed between the liquid crystal display panel and the cover lens. A gap layer is formed between the first optical film and the liquid crystal display panel. The first polarized film is disposed between the first optical film and the cover lens.

21 Claims, 8 Drawing Sheets

DISPLAY DEVICE

BACKGROUND OF THE INVENTION

1. Field of the Invention

The present invention is related to a display device, and more particularly, to a display device including an optical film having a ¼ wavelength retardation effect, a polarized film and a gap layer.

2. Description of the Prior Art

Liquid crystal display panel is promoted as the mainstream production of display devices due to its advantages such as light weight, thin structure, low power consumption and low radiation. Please refer to FIG. 1. FIG. 1 is a schematic diagram illustrating a conventional display device. As shown in FIG. 1, a cover lens 102 and an optical clear adhesive (OCA) 104 are disposed on a conventional liquid crystal display panel 100. The cover lens 102 is able to improve protection capability of the liquid crystal display panel 100 against external forces. When ambient light 106 penetrates through the cover lens 102, the optical clear adhesive 104 and the liquid crystal display panel 100, the optical clear adhesive 104 could ensure less reflection at the interface B between the cover lens 102 and the optical clear adhesive 104 and at the interface C between the optical clear adhesive 104 and the liquid crystal display panel 100.

However, the skills related to the optical clear adhesive 104 are still immature, the yield is low and bubbles occur frequently during manufacture process, furthermore, the optical clear adhesive 104 could not be reworked, so the defects of the optical clear adhesive 104 may cause the scrap of the whole display device and serious impact on the yield elevation. Additionally, the display device is usually integrated with touch control function. The conventional liquid crystal display panel 100 as the structure shown in FIG. 1 may be distorted when being pressed by the user for touch control, and thus the components of the liquid crystal display panel 100 may be permanently damaged. Accordingly, a display device with better design to overcome the problem of ambient light reflection and to possess the good buffer capability against external forces is required to facilitate the touch control operation.

SUMMARY OF THE INVENTION

It is therefore one of the objectives of the present invention to provide a display device to solve the ambient light reflection problem and have a gap layer with buffer capability.

A display device according to an exemplary embodiment of the present invention is provided. The display device includes a liquid crystal display panel, a cover lens, a first optical film and a first polarized film. The liquid crystal display panel is preferably a vertical alignment mode liquid crystal display panel. The cover lens is disposed on a light exit surface of the liquid crystal display panel. The first optical film is disposed between the liquid crystal display panel and the cover lens. The first optical film has a ¼ wavelength retardation effect and a gap layer is formed between the first optical film and the liquid crystal display panel. The first polarized film is disposed between the first optical film and the cover lens.

The display device according to the present invention has the optical film with ¼ wavelength retardation effect and the first polarized film with linear polarization effect for preventing the disturbance of ambient light reflection effectively. Furthermore, the display device according to the present invention has the gap layer to provide buffer against external forces, and thus is particularly suitable for being used in the touch panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, preferred embodiments will be made in detail. The preferred embodiments of the present invention are illustrated in the accompanying drawings with numbered elements.

Figure 1:
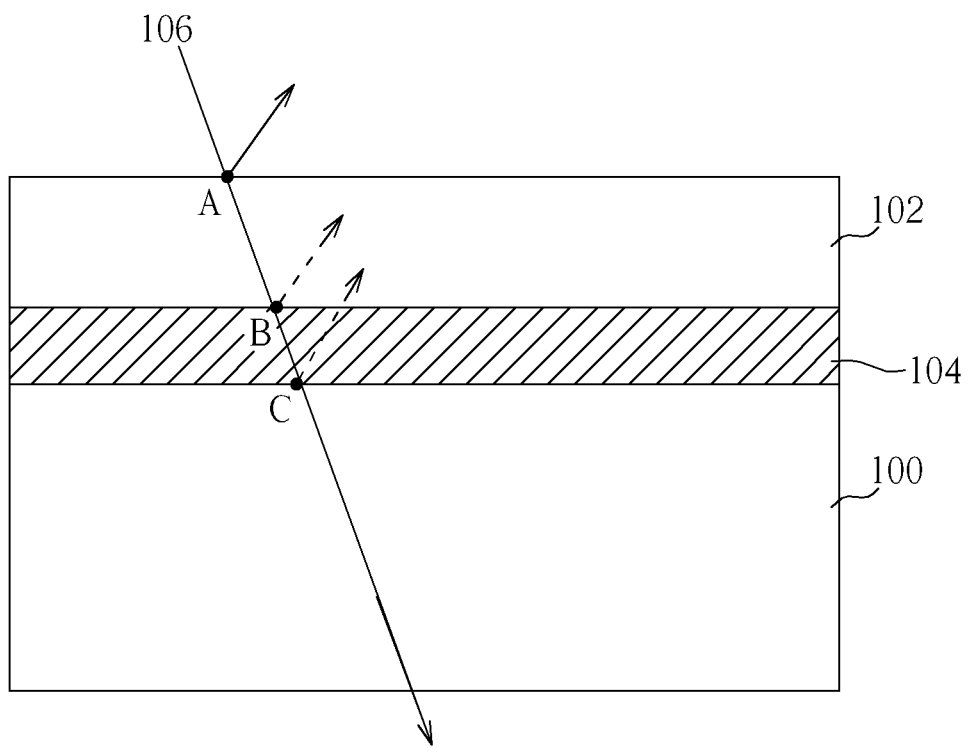
FIG. 1 is a schematic diagram illustrating a conventional display device.
Figure 2:
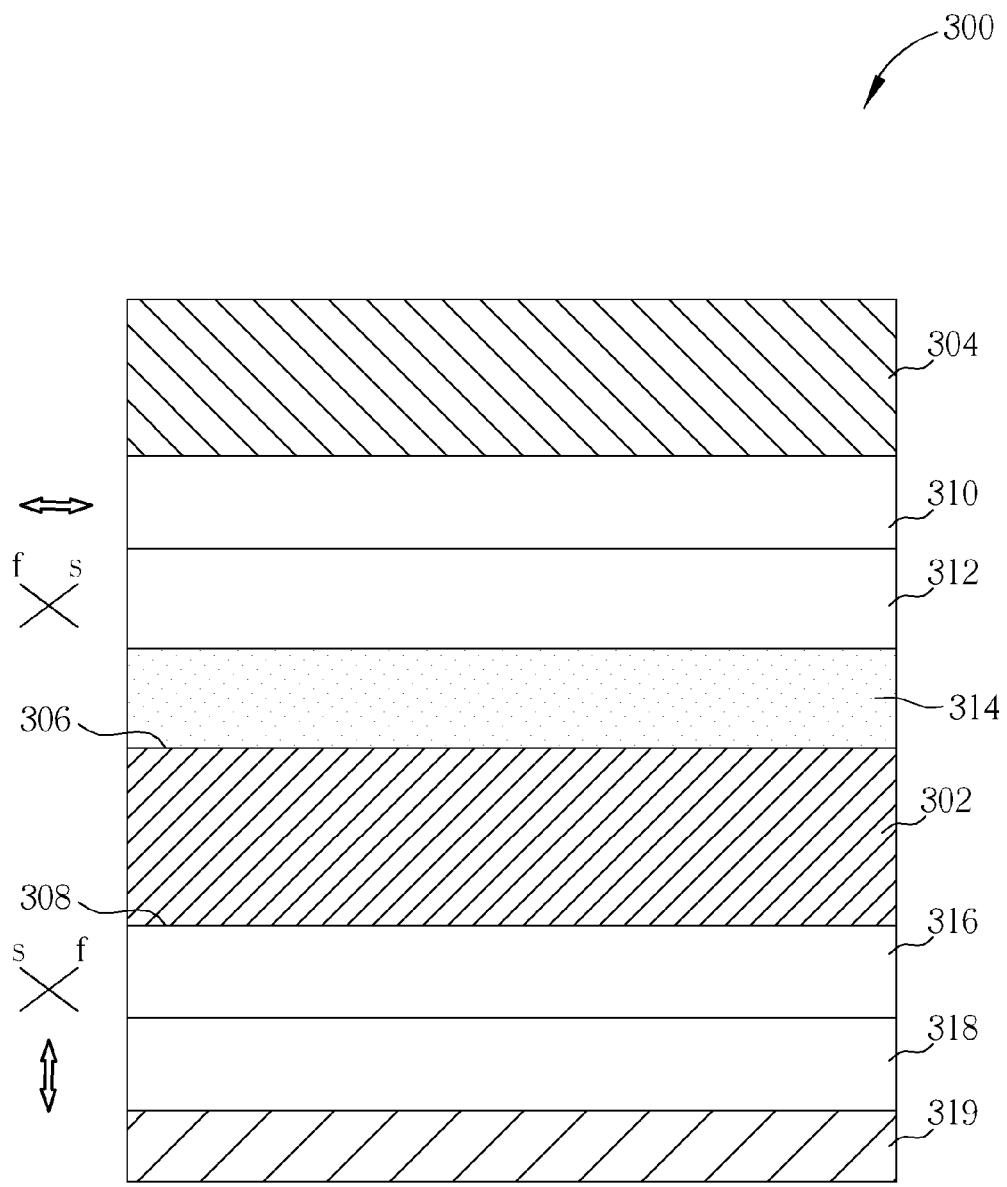
FIG. 2 is a schematic diagram illustrating a display device according to a first exemplary embodiment of the present invention.

Please refer to FIG. 2. FIG. 2 is a schematic diagram illustrating a display device according to a first exemplary embodiment of the present invention. As shown in FIG. 2, the display device 300 according to this exemplary embodiment includes a liquid crystal display panel 302, a backlight source 319, and a cover lens 304. In this exemplary embodiment, the liquid crystal display panel 302 is disposed between the backlight source 319 and the cover lens 304. The liquid crystal display panel 302 could be any type of liquid crystal display panels 302 such as vertical alignment (VA) mode liquid crystal display panel, in plane switch (IPS) mode liquid crystal display panel, multi-domain vertical alignment (MVA) mode liquid crystal display panel, twist nematic (TN) mode liquid crystal display panel, super twist nematic (STN) mode liquid crystal display panel, fringe field switching (FFS) mode liquid crystal display panel, etc., but not limited thereto. The liquid crystal display panel 302 has a light exit surface 306 and a light enter surface 308 with respect to the location of the backlight source 319. The cover lens 304 is disposed at the same side as the light exit surface 306 of the liquid crystal display panel 302, and the cover lens 304 has the protective function or water-resistance property. Furthermore, the material of the cover lens 304 could be organic material such as benzocyclobutane (BCB), cycloalkene, polyimide, polyamide, polyester, polyol, poly(ethylene oxide) (PEO), polyphenyl, resins, polyether, polyketone, etc., other inorganic material such as silicon oxide $SiO_x$, silicon nitride $SiN_x$, silicon oxynitride $SiO_xN_y$, silicon carbide $SiC_x$, aluminum oxide $Al_xO_y$, etc., or composite thin film of organic material and inorganic material, but not limited thereto. The backlight source 319 could be any kind of device for emitting light, for example, cold cathode fluorescent lamp (CCFL) or organic light emitting diode (OLED), but not limited thereto.

In this exemplary embodiment, a gap layer 314, a first optical film 312 and a first polarized film 310 are disposed at the same side as the light exit surface 306 of the liquid crystal display panel 302 in sequence; and a second optical film 316 and a second polarized film 318 are disposed at the same side as the light enter surface 308 of the liquid crystal display panel 302 in sequence. The first polarized film 310 and the second polarized film 318 are optical films having linear polarization effects, and the linear polarization effects of the polarized films may substantially be orthogonal, in other words, an included angle between an absorption axis of the first polarized film 310 and an absorption axis of the second polarized film 318 is substantially 90°, or an included angle between an transmitting axis of the first polarized film 310 and an transmitting axis of the second polarized film 318 is substantially 90°. The first optical film 312 and the second optical film 316 are optical films having ¼ wavelength retardation effects, an included angle between a slow axis (labeled as s in FIG. 2) of the first optical film 312 and a slow axis of the second optical film 316 is substantially 90°, or an included angle between a fast axis (labeled as f in FIG. 2) of the first optical film 312 and a fast axis of the second optical film 316 is substantially 90°. Additionally, an included angle between one of the absorption axis and the transmitting axis of the first polarized film 310 and the slow axis of the first optical film 312 is preferably about 45° or 135°, but not limited thereto. The gap layer 314 is formed between the first optical film 312 and the liquid crystal display panel 302. The gap layer 314 is preferably an air layer, and the gap layer 314 could also include other fluid materials such as gas or liquid to serve as a buffer layer against external forces. In this exemplary embodiment, a refractive index of the gap layer 314 is substantially smaller than a refractive index of the liquid crystal display panel 302 and a refractive index of the first optical film 312, but not limited thereto.

Figure 3:
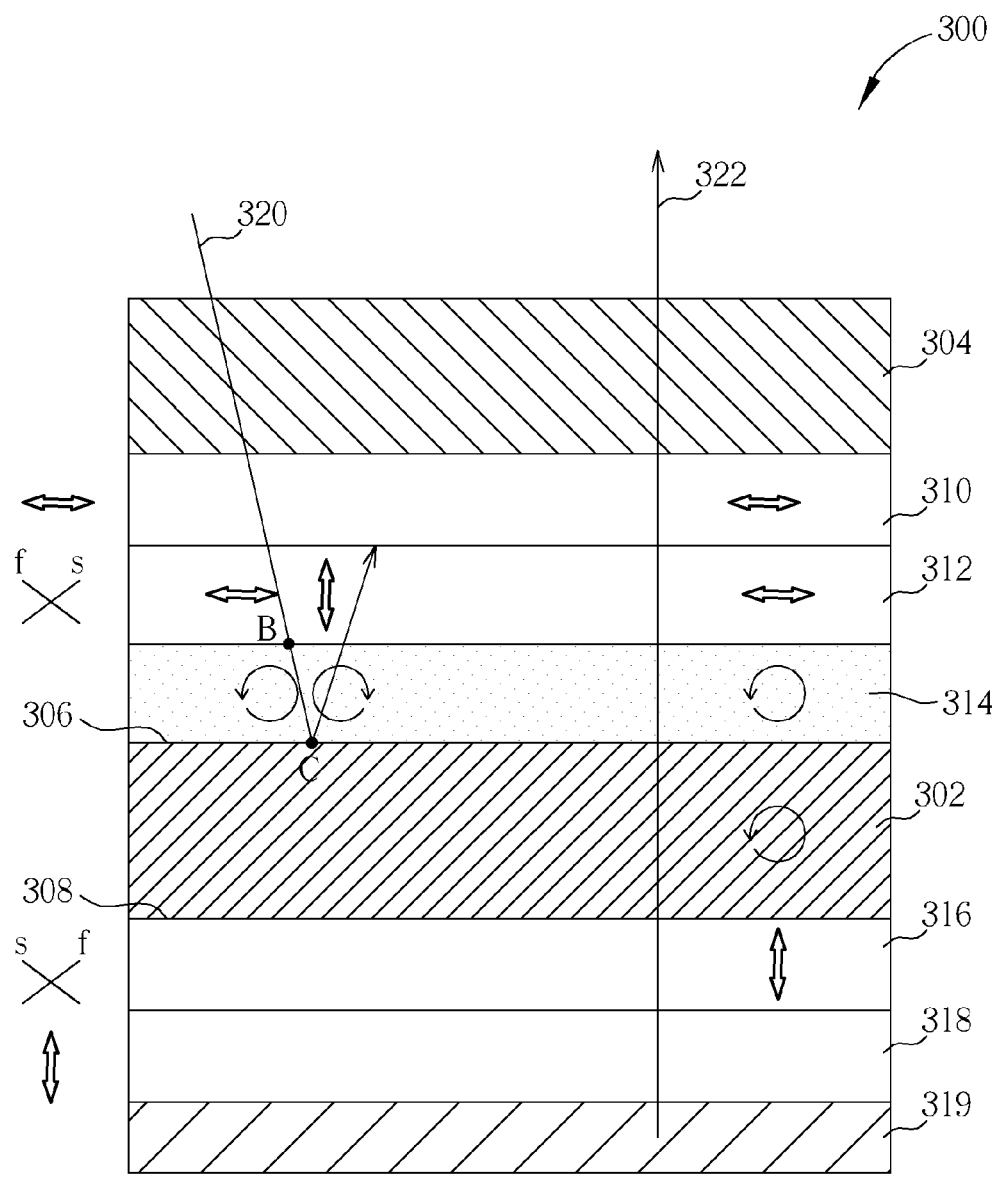
FIG. 3 is a polarized light distribution schematic diagram illustrating polarized lights of an ambient light and a backlight according to a first exemplary embodiment of the present invention.

To overcome the disturbance of ambient light reflection in the conventional display device, the display device 300 of the present invention utilizes the first optical film 312 having ¼ wavelength retardation effect and the first polarized film 310 having linear polarization effect. Please refer to FIG. 3. FIG. 3 is a polarized light distribution schematic diagram illustrating polarized lights of an ambient light and a backlight according to a first exemplary embodiment of the present invention. As shown in FIG. 3, an ambient light 320 enters the display device 300 through the cover lens 304, and the ambient light 320 becomes a linear polarized light (a horizontal arrow in FIG. 3 represents a direction of polarized light) after passing through the first polarized film 310 having linear polarization effect. The linear polarized light becomes a circular polarized light (a right-circular sign in FIG. 3 represents a direction of polarized light) after passing through the first optical film 312 having ¼ wavelength retardation effect, and the circular polarized light enters the gap layer 314. When the circular polarized light is reflected at an interface C between the gap layer 314 and the liquid crystal display panel 302, the direction of a reflected circular polarized light may be reversed (a left-circular sign in FIG. 3 represents a direction of reflected polarized light). The reflected left-circular polarized light turns into a linear polarized light again (a vertical arrow in FIG. 3 represents a direction of polarized light) when entering the first optical film 312. The direction of the linear polarized light before reflection (horizontal arrow) and the direction of the linear polarized light after reflection (vertical arrow) are different, accordingly, the linear polarized light after reflection is unable to pass through the first polarized film 310. Consequently, the ambient light 320 passes through the first polarized film 310 and the first optical film 312, and is reflected at the interface C, the reflected polarized light is unable to pass through the first polarized film 310 again and unable to influence the viewer anymore. Similarly, when the ambient light 320 is reflected at the interface B between the gap layer 314 and the first optical film 312, the reflected polarized light is also unable to pass through the first polarized film 310 again. According to the previous description, it is appreciated that reflection disturbance could be decreased dramatically even if the display device 300 of the present invention is under strong ambient light 320 condition.

In addition, for preventing adverse influence on the light emitting of the backlight source 319, the second optical film 316 and the second polarized film 318 are disposed at the same side as the light enter surface 308 of the display device 300 of the present invention. Please refer to FIG. 3 again. A backlight 322 is emitted from the backlight source 319, the backlight 322 becomes a linear polarized light (a vertical arrow in FIG. 3 represents a direction of polarized light) after passing through the second polarized film 318, and the linear polarized light becomes a right-circular polarized light (a right-circular sign in FIG. 3 represents a direction of polarized light) after passing through the second optical film 316. Furthermore, after passing through the liquid crystal display panel 302 and the gap layer 314, the right-circular polarized light turns into a linear polarized light again (a horizontal arrow in FIG. 3 represents a direction of polarized light) when entering the first optical film 312, this linear polarized light could pass through the first polarized film 310 and the cover lens 304, and this linear polarized light may be finally received by the viewer. Accordingly, the disposition of the display device 300 prevents the reflection of the ambient light 320, and keeps the regular emitting of the backlight 322 and the normal display of the liquid crystal display panel 302. Additionally, in another exemplary embodiment according to the present invention, the second optical film 316 could also be disposed between the liquid crystal display panel 302 and the gap layer 314 to fulfill the function mentioned above, furthermore, the refractive index of the gap layer 314 is substantially smaller than a refractive index of the second optical film 316.

Figure 4:
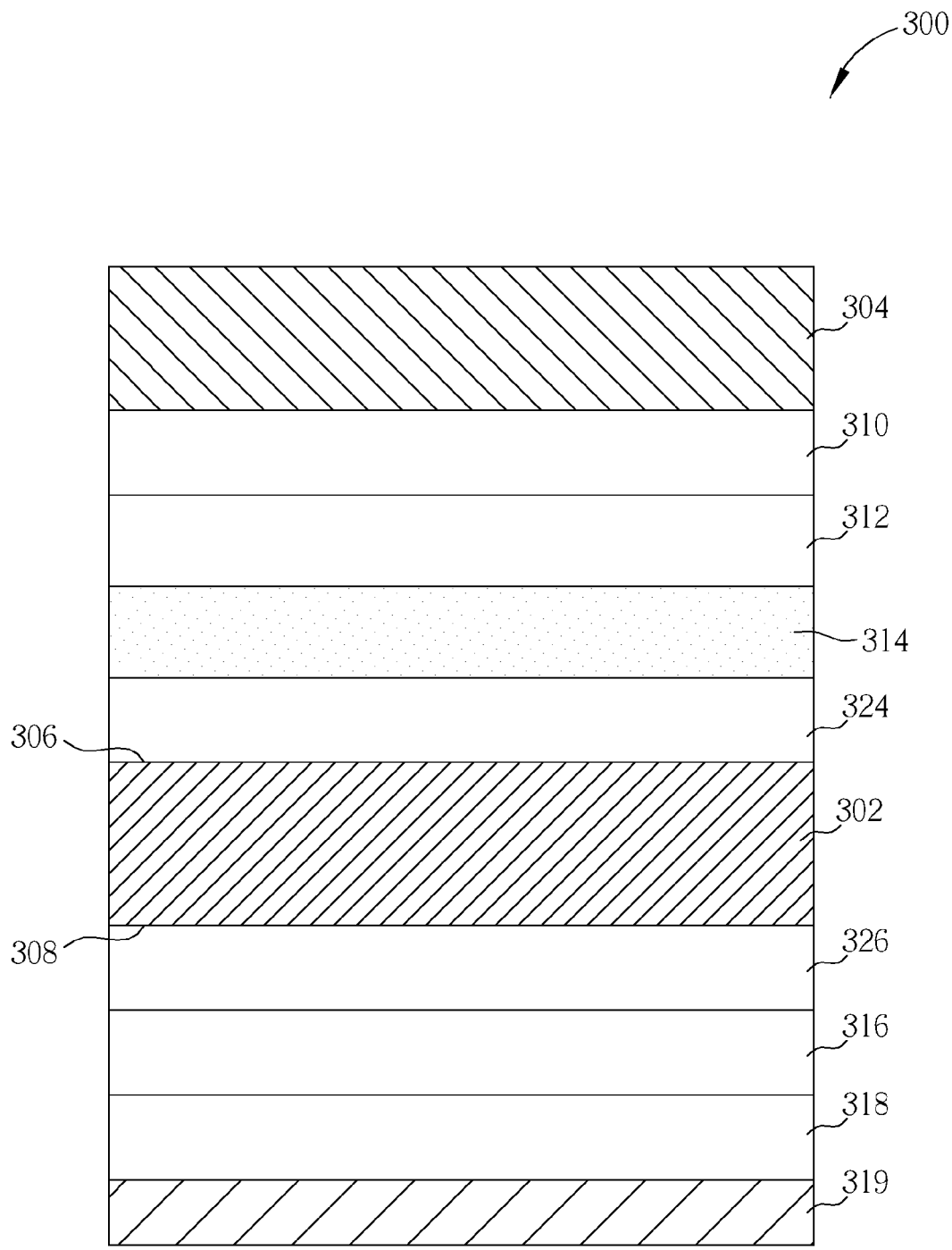
FIG. 4 is a schematic diagram illustrating a display device according to a second exemplary embodiment of the present invention.

Please refer to FIG. 4. FIG. 4 is a schematic diagram illustrating a display device according to a second exemplary embodiment of the present invention. To simplify the explanation and to clarify the comparison, the same components are denoted by the same numerals. As shown in FIG. 4, when the liquid crystal display panel 302 is vertical alignment mode, to enhance the display quality, the display device 300 could further include a first phase compensation film 324 and a second phase compensation film 326. The first phase compensation film 324 is disposed at the same side as the light exit surface 306 of the liquid crystal display panel 302, and the second phase compensation film 326 is disposed at the same side as the light enter surface 308 of the liquid crystal display panel 302. The first phase compensation film 324 and the second phase compensation film 326 have phase compensation effects, particularly, the light axis of the first phase compensation film 324 and the light axis of the second phase compensation film 326 are both perpendicular to the light exit surface 306 of the liquid crystal display panel 302. In this exemplary embodiment, the first phase compensation film 324 is disposed between the liquid crystal display panel 302 and the gap layer 314, and the second phase compensation film 326 is disposed between the liquid crystal display panel 302 and the second optical film 316, but not limited thereto. For instance, the first phase compensation film 324 could also be disposed between the cover lens 304 and the first polarized film 310, and the second phase compensation film 326 could also be disposed on the other side of the second polarized film 318 oppositely to the side facing the second optical film 316.

Figure 5:
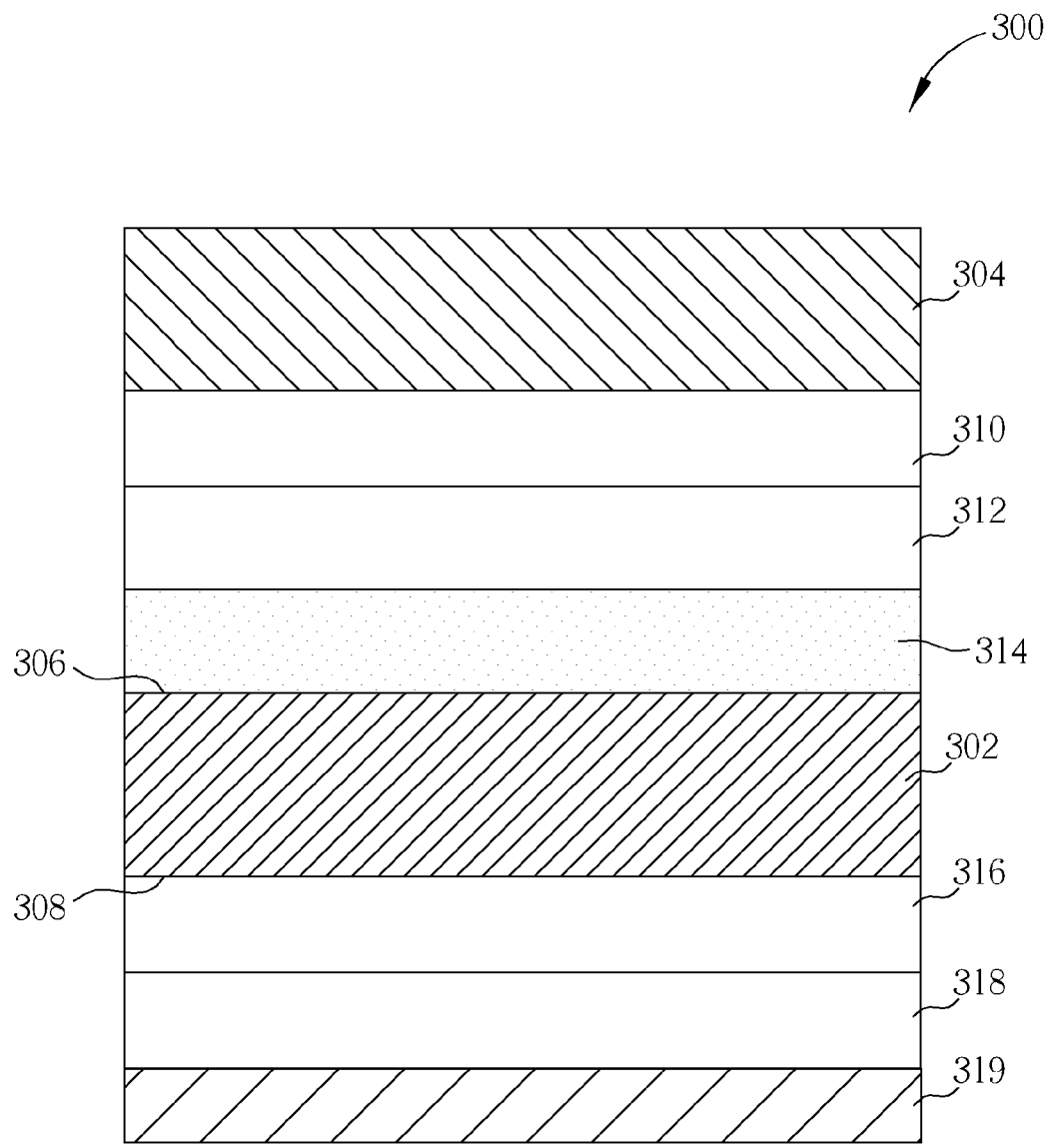
FIG. 5 is a schematic diagram illustrating a display device according to a third exemplary embodiment of the present invention.

Please refer to FIG. 5. FIG. 5 is a schematic diagram illustrating a display device according to a third exemplary embodiment of the present invention. In this exemplary embodiment, the effect of the phase compensation film in the second exemplary embodiment could be integrated into the first optical film 312, in other words, the first optical film 312 is able to have phase compensation effect and ¼ wavelength retardation effect simultaneously, i.e. the first optical film 312 could be a biaxial optical film. As shown in FIG. 5, both of the first optical film 312 and the second optical film 316 have phase compensation effect and ¼ wavelength retardation effect. An included angle between a slow axis of the first optical film 312 and a slow axis of the second optical film 316 is substantially 90°, and the light axis of the first optical film 312 and the light axis of the second optical film 316 are perpendicular to the light exit surface 306 of the liquid crystal display panel 302.

Figure 6:
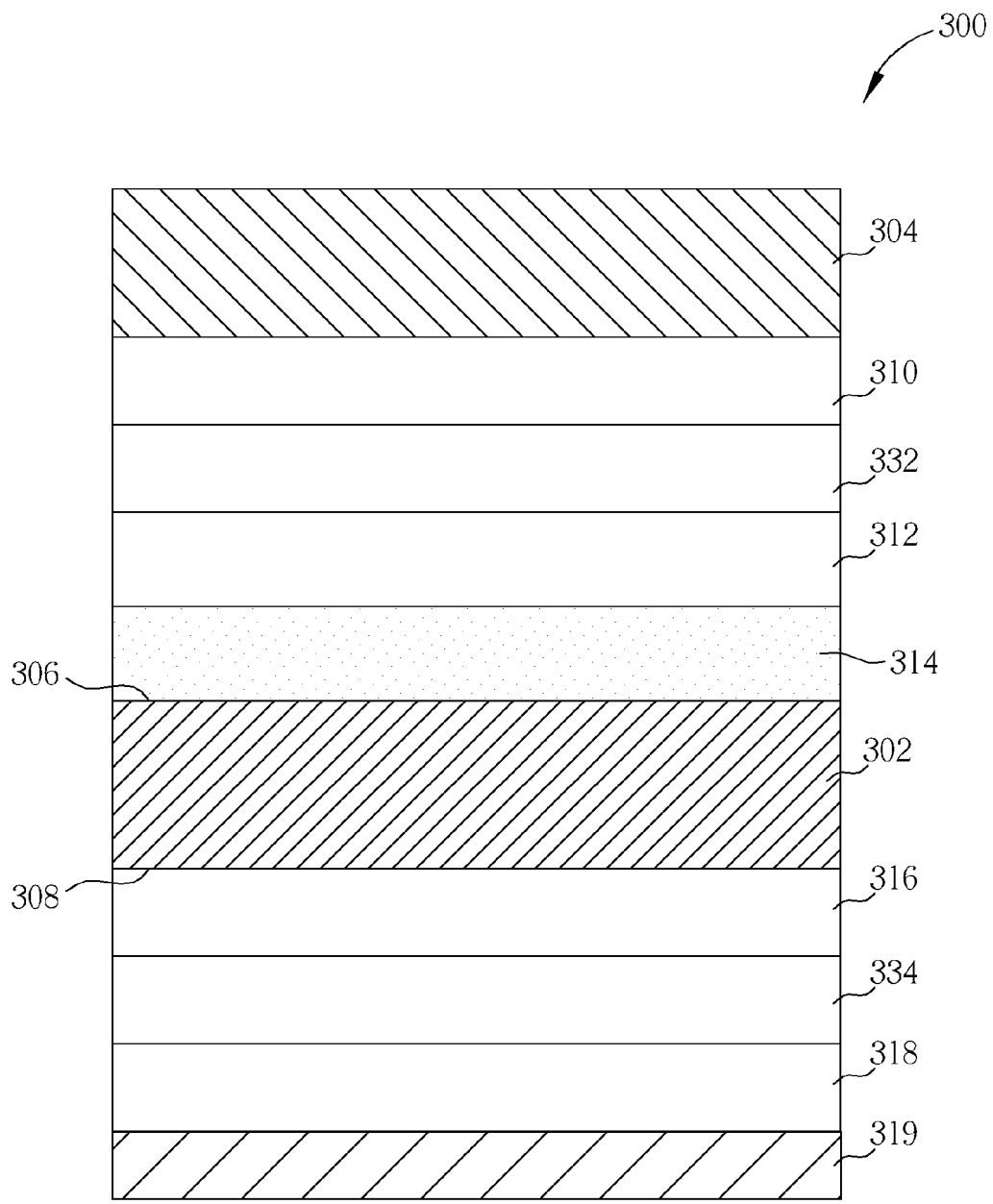
FIG. 6 is a schematic diagram illustrating a display device according to a fourth exemplary embodiment of the present invention.

Please refer to FIG. 6. FIG. 6 is a schematic diagram illustrating a display device according to a fourth exemplary embodiment of the present invention. In this exemplary embodiment, for solving the problem of ambient light reflection in the conventional display device more effectively, in addition to the optical film having a ¼ wavelength retardation effect, at least one optical film having a ½ wavelength retardation effect may be optionally added to the display device 300. As shown in FIG. 6, the display device 300 according to this exemplary embodiment further includes a first ½ wavelength retardation film 332 and a second ½ wavelength retardation film 334. The first ½ wavelength retardation film 332 is disposed at the same side as the light exit surface 306 of the liquid crystal display panel 302, and the second ½ wavelength retardation film 334 is disposed at the same side as the light enter surface 308 of the liquid crystal display panel 302. Preferably, the first ½ wavelength retardation film 332 is disposed between the first polarized film 310 and the first optical film 312, and the second ½ wavelength retardation film 334 is disposed between the second polarized film 318 and the second optical film 316. In this exemplary embodiment, an included angle between a slow axis of the first ½ wavelength retardation film 332 and a slow axis of the second ½ wavelength retardation film 334 is substantially 90°.

Figure 7:
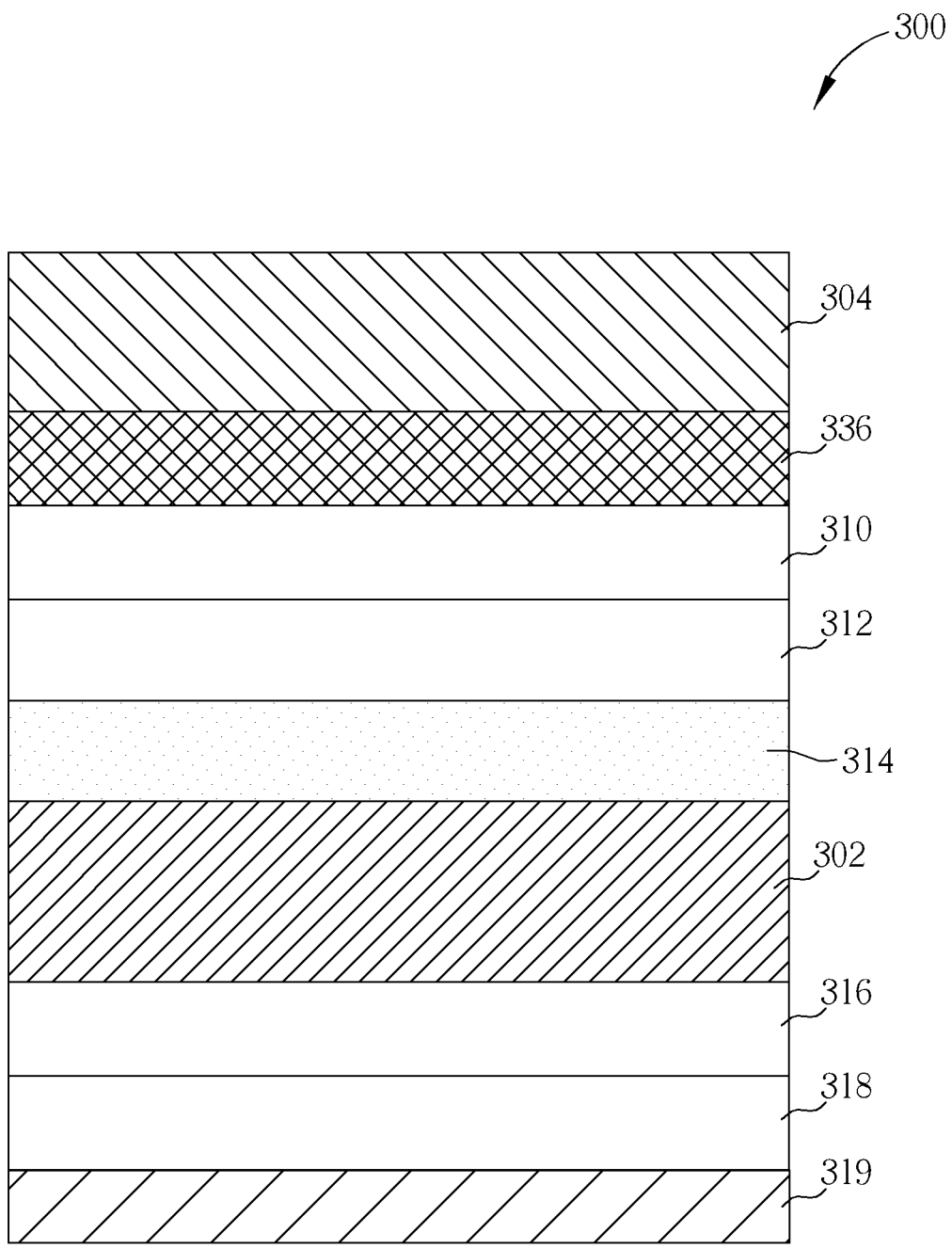
FIG. 7 and FIG. 8 are schematic diagrams illustrating two touch display devices of the present invention.
Figure 8:
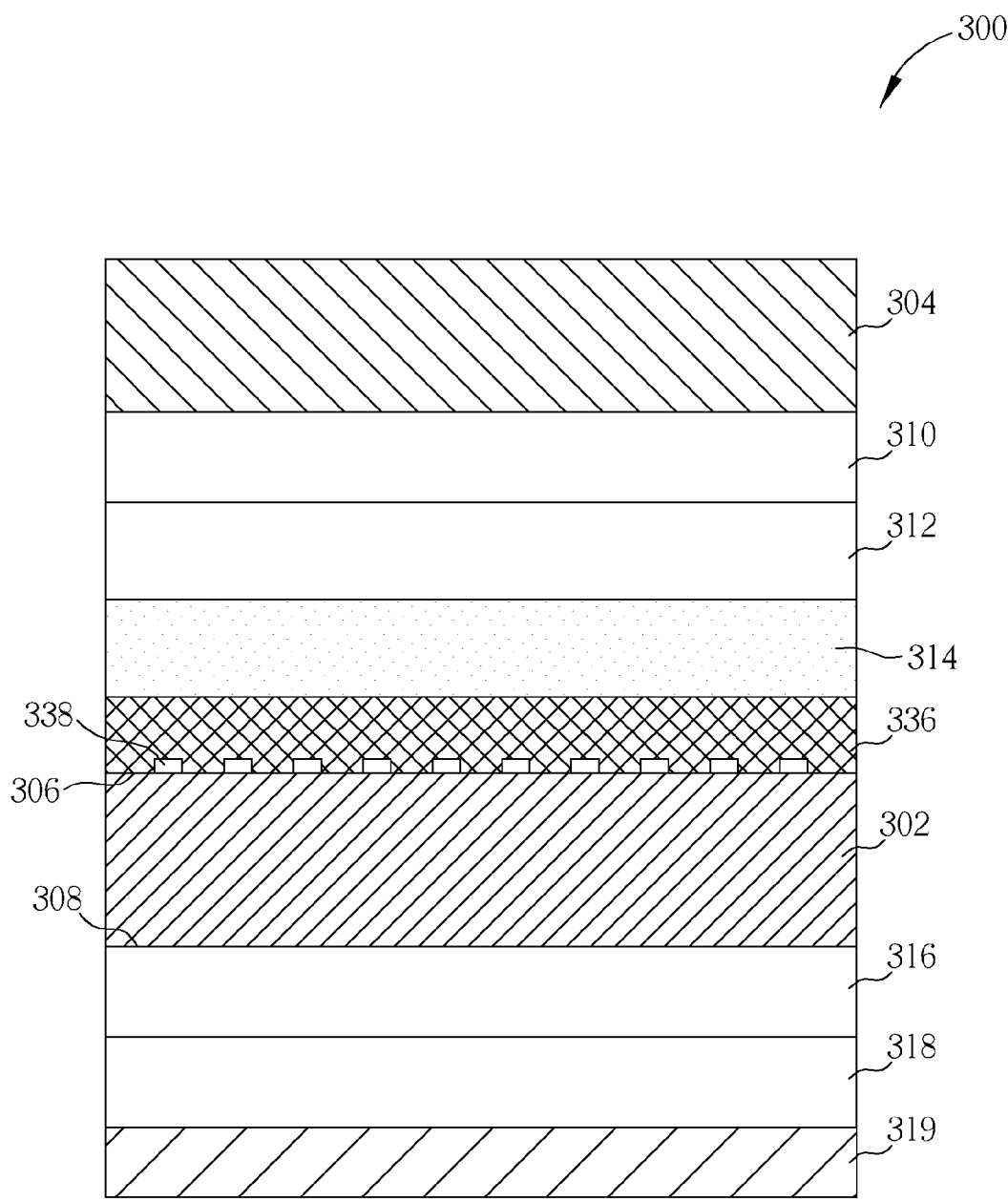

Furthermore, the display device 300 of the present invention could also be equipped with touch control function to be a touch panel. Please refer to FIG. 7 and FIG. 8. FIG. 7 and FIG. 8 are schematic diagrams illustrating two touch display devices of the present invention, respectively, where FIG. 7 illustrates an on-cell touch display device, and FIG. 8 illustrates an in-cell touch display device. As shown in FIG. 7, the display device 300 according to this exemplary embodiment further includes a touch panel 336 preferably disposed between the cover lens 304 and the first polarized film 310 to serve as an on-cell touch panel. Alternatively, as shown in FIG. 8, the touch panel 336 is disposed between the liquid crystal display panel 302 and the gap layer 314, and components 338 of the touch panel 336 are disposed at the light exit surface 306 of the liquid crystal display panel 302 to serve as an in-cell touch panel. In this exemplary embodiment, the refractive index of the gap layer 314 is substantially smaller than a refractive index of the touch panel 336. It is appreciated that, any kind of the touch panels including the on-cell touch panel, the in-cell touch panel or any other type touch panel could utilize any disposition way of optical films illustrated in the first exemplary embodiment through the fourth exemplary embodiment of the display device 300.

In the schematic diagrams of exemplary embodiments mentioned above, each optical film represents a separate optical film having individual optical effect, but it is appreciated that optical films with different effects could be integrated into one optical film according to the manufacturing process. For instance, each optical film disposed on the light exit surface 306 of the liquid crystal display panel 302 could be integrated into one optical film having multiple effects, and each optical film disposed on the light enter surface 308 of the liquid crystal display panel 302 could also be integrated into one optical film having multiple effects. As the first exemplary embodiment shown in FIG. 2, the first polarized film 310, the first optical film 312 and the gap layer 314 could be integrated into the same optical film, and the second polarized film 318 and the second optical film 316 could be integrated into the same optical film. In all the exemplary embodiments, the cover lens 304 is still an individual optical film from the optical films disposed below, however, in other exemplary embodiments, the cover lens 304 could be integrated into the optical films disposed below as the same optical film by means of manufacturing process. Each optical film illustrated above, the gap layer 314 and the cover lens 304 could be integrated into the same optical film, and the corresponding arrangement sequence is not detailed here.

In conclusion, the display device according to the present invention has the optical film with ¼ wavelength retardation effect and the first polarized film with linear polarization effect for preventing the disturbance of ambient light reflection effectively. Furthermore, the display device according to the present invention has the gap layer to provide buffer against external forces, and thus is particularly suitable for being used in the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
   a liquid crystal display panel, wherein the liquid crystal display panel is vertical alignment mode;
   a cover lens disposed on a light exit surface of the liquid crystal display panel;
   a first optical film disposed between the liquid crystal display panel and the cover lens, wherein the first optical film has a ¼ wavelength retardation effect, the first optical film comprises a ¼ wavelength retardation film, and a gap layer is disposed between the first optical film and the liquid crystal display panel;
   a first phase compensation film disposed between the first optical film and the liquid crystal display panel, wherein the gap layer is disposed between the first phase compensation film and the first optical film; and
   a first polarized film disposed between the first optical film and the cover lens.

2. The display panel of claim 1, wherein a refractive index of the gap layer is substantially smaller than a refractive index of the liquid crystal display panel.

3. The display panel of claim 1, wherein the gap layer comprises an air layer.

4. The display panel of claim 1, wherein a light axis of the first phase compensation film is perpendicular to the light exit surface of the liquid crystal display panel.

5. The display panel of claim 1, wherein a refractive index of the gap layer is substantially smaller than a refractive index of the first phase compensation film.

6. The display panel of claim 1, further comprising a second phase compensation film, a second ¼ wavelength retardation film and a second polarized film, disposed on the other surface of the liquid crystal display panel oppositely to the light exit surface of the liquid crystal display panel.

7. The display panel of claim 1, further comprising a first ½ wavelength retardation film disposed between the first optical film and the first polarized film.

8. The display panel of claim 7, further comprising a second ½ wavelength retardation film disposed on the other surface of the liquid crystal display panel oppositely to the light exit surface of the liquid crystal display panel.

9. The display panel of claim 1, further comprising a touch panel disposed between the first polarized film and the cover lens.

10. The display panel of claim 1, further comprising a touch panel disposed between the liquid crystal display panel and the gap layer.

11. The display panel of claim 10, wherein components of the touch panel are disposed on the light exit surface of the liquid crystal display panel.

12. The display panel of claim 10, wherein a refractive index of the gap layer is substantially smaller than a refractive index of the touch panel.

13. A display panel, comprising:
a liquid crystal display panel, wherein the liquid crystal display panel is vertical alignment mode;
a cover lens disposed on a light exit surface of the liquid crystal display panel;
a first optical film disposed between the liquid crystal display panel and the cover lens, wherein the first optical film has a ¼ wavelength retardation effect, the first optical film comprises a first biaxial optical film, a light axis of the first biaxial optical film is perpendicular to the light exit surface of the liquid crystal display panel, and a gap layer is disposed between the first optical film and the liquid crystal display panel; and
a first polarized film disposed between the first optical film and the cover lens.

14. The display panel of claim 13, further comprising a second biaxial optical film and a second polarized film disposed on the other surface of the liquid crystal display panel oppositely to the light exit surface of the liquid crystal display panel.

15. The display panel of claim 14, wherein an included angle between a slow light axis of the first biaxial optical film and a slow light axis of the second biaxial optical film is substantially 90°.

16. The display panel of claim 13, further comprising a first ½ wavelength retardation film disposed between the first optical film and the first polarized film.

17. The display panel of claim 16, further comprising a second ½ wavelength retardation film disposed on the other surface of the liquid crystal display panel oppositely to the light exit surface of the liquid crystal display panel.

18. The display panel of claim 13, further comprising a touch panel disposed between the first polarized film and the cover lens.

19. The display panel of claim 13, further comprising a touch panel disposed between the liquid crystal display panel and the gap layer.

20. The display panel of claim 19, wherein components of the touch panel are disposed on the light exit surface of the liquid crystal display panel.

21. The display panel of claim 19, wherein a refractive index of the gap layer is substantially smaller than a refractive index of the touch panel.

* * * * *